United States Patent
Thenthiruperai

(12) 
(10) Patent No.: US 8,301,795 B1
(45) Date of Patent: Oct. 30, 2012

(54) METHOD AND SYSTEM FOR MANAGING ABNORMAL DISCONNECTS DURING A STREAMING MEDIA SESSION

(75) Inventor: Balaji S. Thenthiruperai, Prairie Village, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 2 days.

(21) Appl. No.: 13/081,946

(22) Filed: Apr. 7, 2011

Related U.S. Application Data

(63) Continuation of application No. 10/691,273, filed on Oct. 22, 2003, now abandoned.

(51) Int. Cl.
G06F 15/16 (2006.01)
(52) U.S. Cl. .......................... 709/231; 370/335; 370/338
(58) Field of Classification Search .................. 709/231; 370/335, 338
See application file for complete search history.

(56) References Cited

U.S. PATENT DOCUMENTS

| 6,894,994 B1* | 5/2005 | Grob et al. ..................... 370/335 |
| 2002/0065074 A1* | 5/2002 | Cohn et al. ..................... 455/422 |

* cited by examiner

Primary Examiner — Frantz Jean

(57) ABSTRACT

A method for streaming multimedia content in a wireless communication system. The exemplary method includes receiving, in a data network, a request from a mobile device to stream multimedia content to the mobile device from the data network, where the request is transmitted over a wireless connection. The method further includes streaming a portion of the requested multimedia content from the data network to the mobile device. The method also includes detecting termination of the wireless connection during the streaming and retaining information in at least one of a device in the data network and the mobile device, where the information indicates a point in the multimedia content stream where the termination of the wireless connection occurred. The method still further includes re-establishing the wireless connection and resuming streaming of the multimedia content based on the retained information.

20 Claims, 5 Drawing Sheets

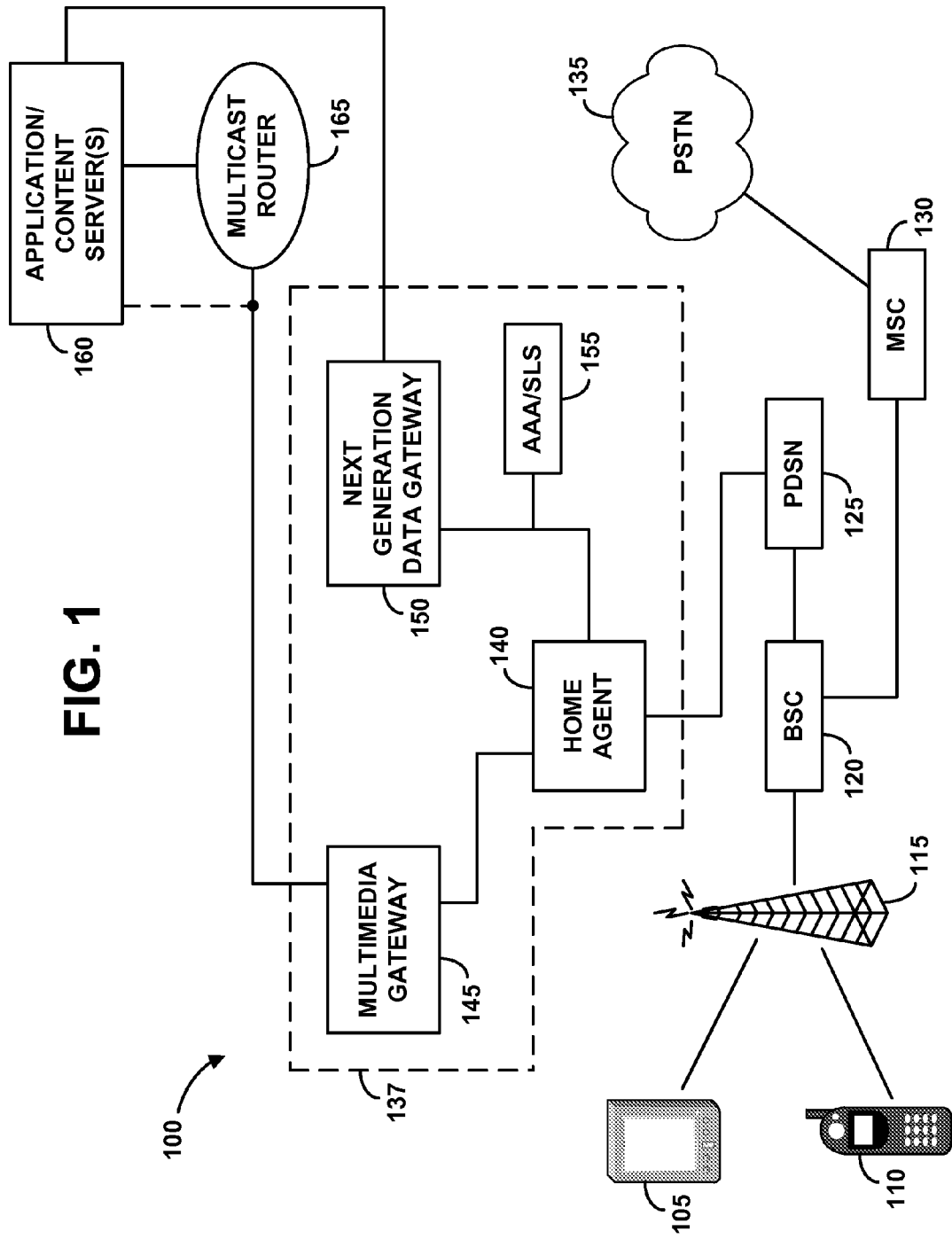

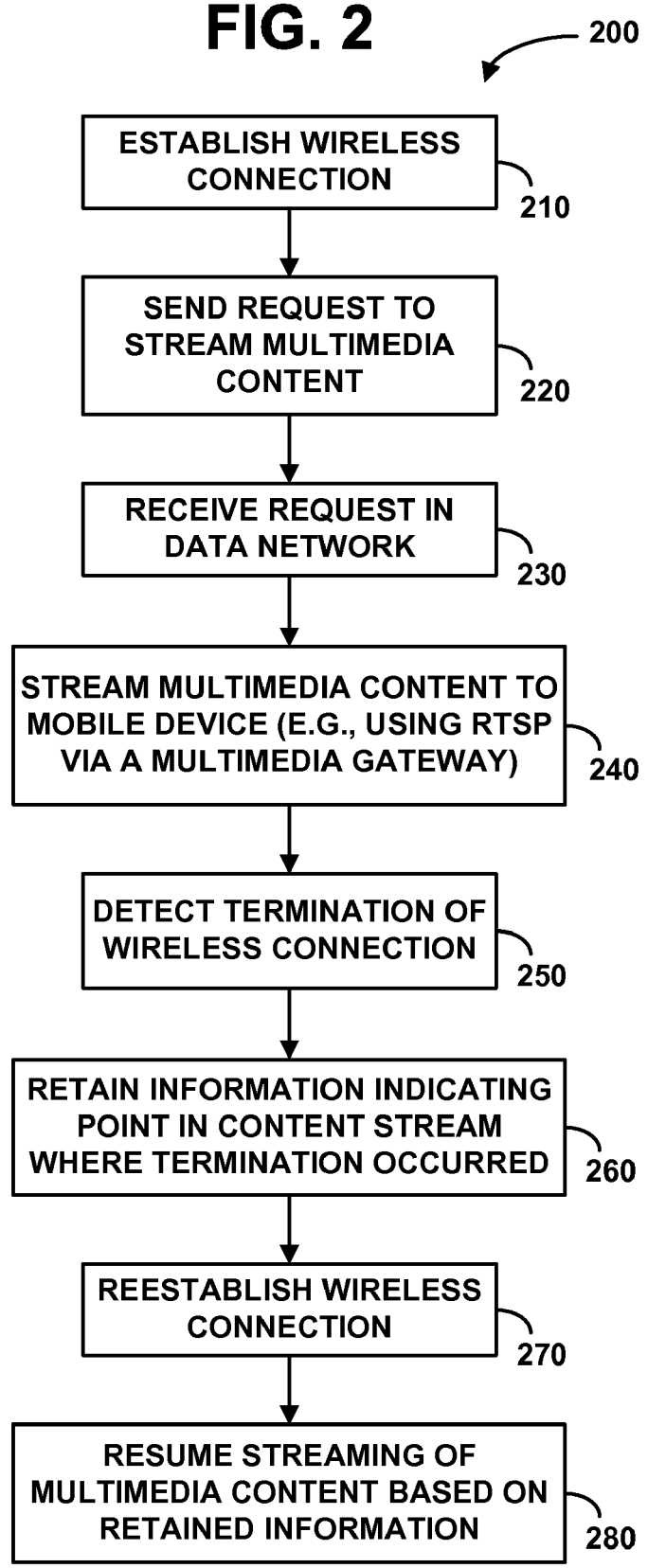

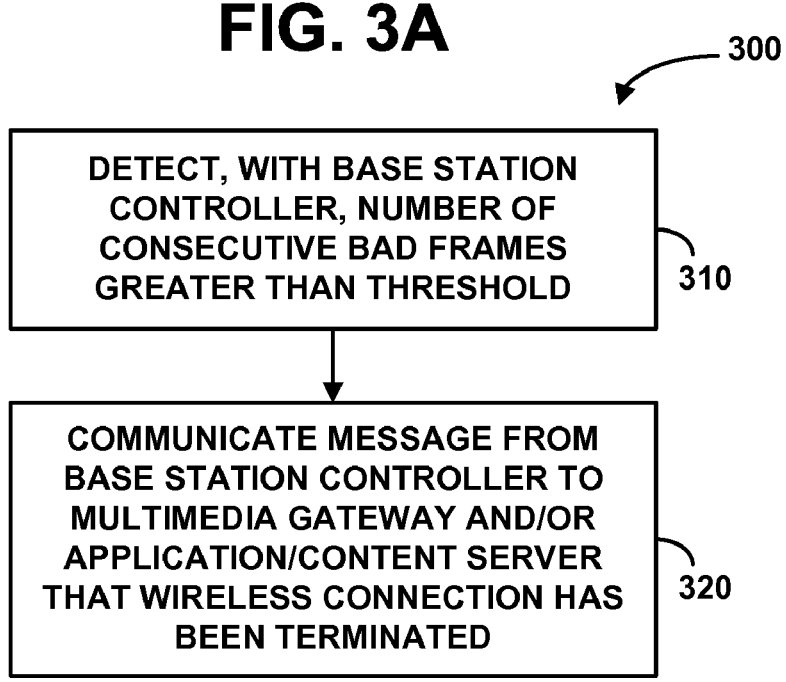
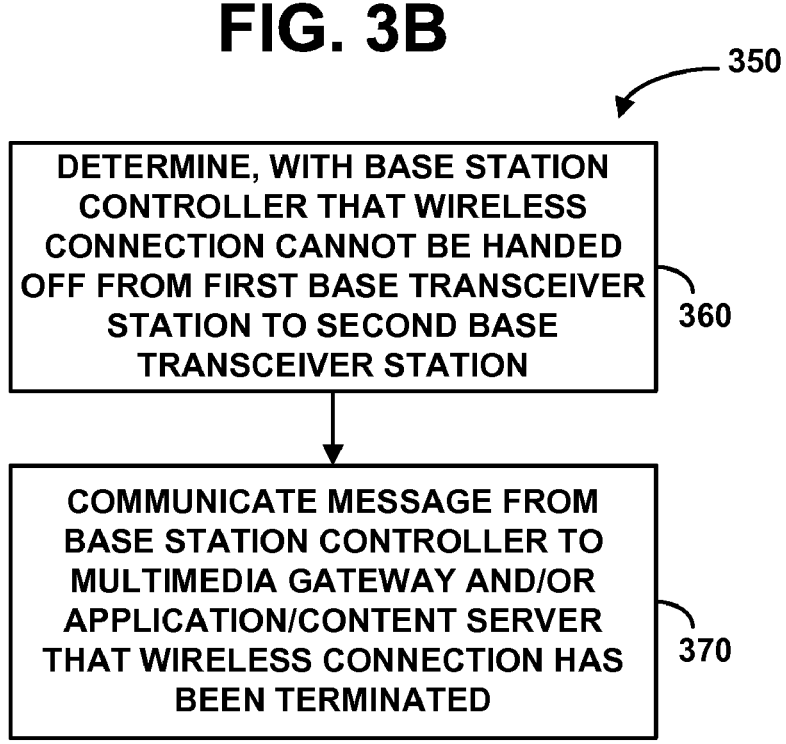

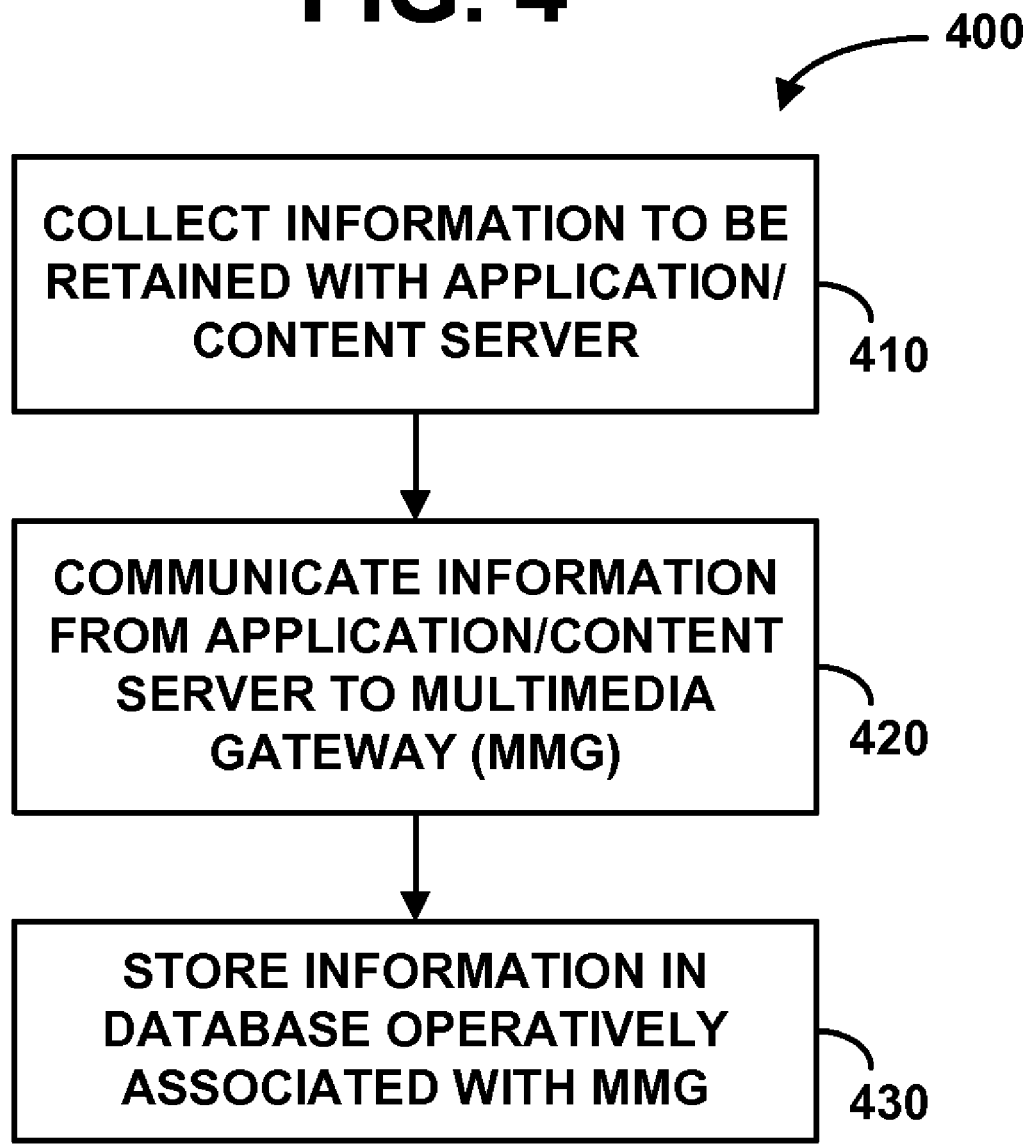

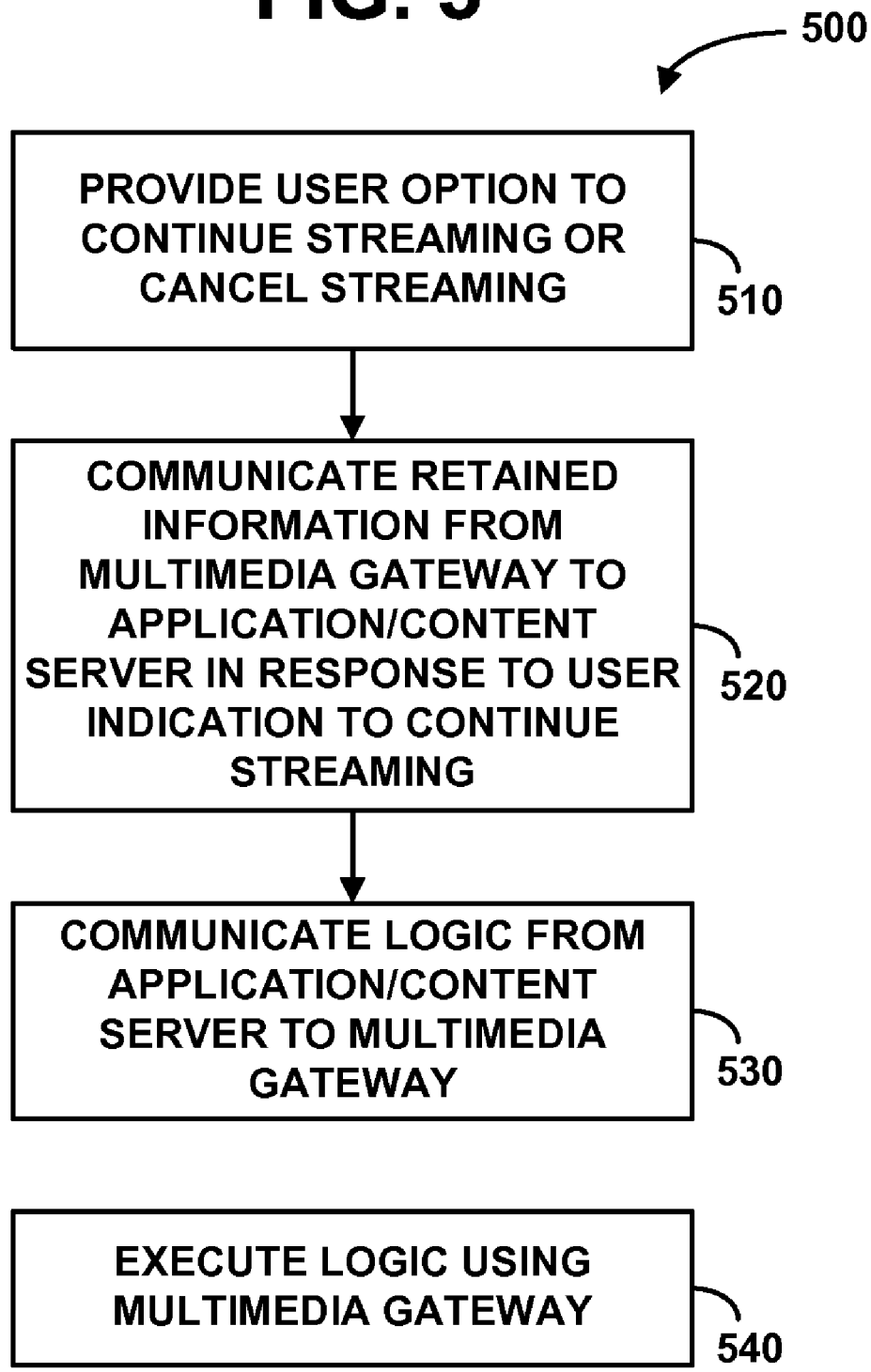

METHOD AND SYSTEM FOR MANAGING ABNORMAL DISCONNECTS DURING A STREAMING MEDIA SESSION

BACKGROUND

I. Field of the Invention

The present invention is directed to multimedia streaming. More particularly, the present invention is directed to methods and systems for managing abnormal disconnects during a streaming media session.

II. Description of Related Art

Wireless communication systems are experiencing rapid advances in the services, products and features that are available to consumers using such communication systems. In this regard, cellular/mobile phones have evolved into mobile devices that provide a rich feature set to consumers, such as Internet access, data network access, the ability to take and send pictures and video, text messaging capabilities, and the ability to playback multimedia content (e.g., music, video), among numerous other features. In fact, such mobile devices may, or may not, include mobile telephone capabilities.

Playing multimedia content on such mobile devices is quickly becoming more and more common. Such playback may be accomplished in various manners. One approach to playing back multimedia content (which may be termed "multimedia clips" or "clips") is to download a clip from a content server (e.g., a computing device, which contains one or more clips) to the mobile device, such as using hypertext transfer protocol (http) based data communication. Once the clip is downloaded to the device, it is then typically played using a media player client installed on the mobile device. For small media clips this may be readily easy to accomplish.

However, for large clips (such as, for example, a feature length movie) downloading clips may not be practical due to the memory capacity and processing capabilities of current mobile devices. In such situations, multimedia clips may be streamed to the mobile device. It will be appreciated, of course, that any size media clip may be streamed. Various techniques (e.g., streaming protocols) for streaming are known to those working in this area. For example, the Real Time Streaming Protocol (RFC 2326, Internet Engineering Task Force, Internet Draft draft-ietf-mmusic-rfc2326bis-04) may be used.

Such streaming of a multimedia clip typically reduces the amount of memory capacity, as opposed to downloading an entire clip before it is played. Such reductions are realized because the multimedia content is communicated to the mobile device continuously (as a stream) and once a portion of the stream is played by the mobile device, it may be discarded.

However, current approaches for streaming multimedia content have certain drawbacks. For example, a wireless connection (over which multimedia clips are streamed) between the mobile device and a data network included in a communication system with which the mobile device is connected may be terminated for any number of reasons (e.g. loss of coverage, signal fade, communication error, etc.). If the wireless connection is terminated during the streaming of a clip, the streaming of that clip will also be terminated.

After the wireless connection is reestablished between the mobile device and the data network, using current approaches, a user of the mobile device must restart streaming of the interrupted clip from the beginning of the clip. For relatively short clips, this may not be too much of an inconvenience for a user, as replaying the clip from the beginning is not overly time consuming. However, for longer clips, restarting the clip from the beginning is both inconvenient and inefficient. Such an approach is time inefficient for the user and resource inefficient for the network resources due the need to re-stream the portion of the clip that was streamed prior to the termination of the wireless connection. Based on the foregoing, alternative approaches for streaming multimedia content are desirable.

SUMMARY

According to an exemplary embodiment, a method for streaming multimedia content in a wireless communication system comprises receiving, in a data network, a request from a mobile device to stream multimedia content to the mobile device from the network. Such a request is transmitted over a wireless connection. The wireless connection may include a physical link, a data link and a network link. The wireless connection may be used to communicate packet data between the data network and the mobile device. After receiving the request in the data network, the method includes streaming a portion of the requested multimedia content from the data network to the mobile device. The method further includes detecting a termination of the wireless connection during the streaming of the multimedia content.

In response to detection of the termination of the wireless connection, information indicating a point in the multimedia content where the termination occurred is retained. This information may be retained in an entity included in the data network. Alternatively, depending on the particular embodiment, the information may be retained in the mobile device. The method further includes re-establishing the wireless connection and then resuming streaming of the multimedia content based on the retained information. For example, the multimedia content may be streamed from the point where termination of the wireless connection occurred, as indicated by the retained information. As one alternative, the multimedia content may be streamed from a point in the content that is a predetermined period of time earlier than the indicated termination point.

In another exemplary embodiment, an option of whether or not to resume streaming the multimedia content may be provided to a user of the mobile device. In yet another exemplary embodiment, resumption of streaming of the multimedia content may occur automatically once the wireless connection is reestablished.

These as well as other advantages of various aspects of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 1 is a block diagram illustrating an exemplary communication system in accordance with an embodiment of the invention;

FIG. 2 is a flowchart illustrating an exemplary method for streaming multimedia content in accordance with an embodiment of the invention, which may be implemented in the communication system of FIG. 1;

FIGS. 3A and 3B are flowcharts illustrating exemplary methods for determining a wireless connection has been terminated in accordance with embodiments of the invention;

FIG. 4 is a flowchart illustrating an exemplary method for retaining information indicating a point in a multimedia content stream where a wireless connection termination occurred in accordance with an embodiment of the invention; and FIG. 5 is a flowchart illustrating an exemplary method for resuming streaming of multimedia content in accordance with an embodiment of the invention.

DETAILED DESCRIPTION

Exemplary System for Streaming Multimedia Content

Referring to FIG. 1, a block diagram of an exemplary wireless communication system 100 which may be used to stream multimedia content to a mobile device (such as mobile devices 105 and 110) is shown. This exemplary system diagram is provided for purposes of illustration and not limitation. It will be appreciated that other media streaming architectures are possible and are within the scope of the present invention.

In addition to the mobile devices 105 and 110, the communication system 100 comprises a base transceiver station (BTS) 115 for communicating with the mobile devices 105 and 110 using radio signals. The BTS 115 is coupled with a base station controller (BSC) 120. The BSC 120 manages the signals sent to/from the BTS 115. Depending on the particular embodiment, the BSC 120 may be coupled with a single BTS 115, or may be coupled with a plurality of BTSs.

The BSC 120 is further coupled with a packet data serving node (PDSN) 125 and a mobile switching center (MSC) 130. The PDSN 125 provides data network access, and manages packet data sent to/from the mobile devices 105 and 110, via the BTS 115 and the BSC 120. The MSC 130 provides connectivity with a public switched telephone network (PSTN) 135 and routes voice information (e.g., phone conversations) to/from the mobile devices 105 and 110, given such capabilities exist on those devices.

The PDSN 125 is coupled with a data network 137 via a Home Agent (HA) 140 device included in the data network 137. As is known, HA 140 is a router on the mobile device's home network (e.g., the data network 137) that maintains information about the device's current location, as identified in a "care-of address." The home network is the data network with which the mobile device is associated, such as a data network of a service provider with which the mobile devices 105 and 110 are associated. The HA 140 uses tunneling mechanisms to forward Internet traffic so that the device's Internet Protocol (IP) address doesn't have to be changed each time it connects from a different location. The HA 140 typically works in conjunction with a foreign agent (e.g., the PDSN 125 in system 100), which is part of a visited network and includes a router for communicating data with the mobile device 105 and the HA 140. Thus, the HA 140 (in conjunction with a foreign agent in some embodiments) controls data communications between networks (home and visited). See TIA Interim Standard—cdma2000 Wireless IP Network Standard, TIA/IS-835-B, September 2002.

The HA 140 is further coupled with a multimedia gateway (MMG) 145 and a next generation data gateway (NGG) 150, which will be discussed further below. The HA 140 is also coupled with an authentication, authorization and accounting server/service creation system (AAA/SCS) 155. Such system configurations are known and provide functionality to authenticate the mobile devices 105 and 110 to provide access to their home network as well as managing the services (e.g., text messaging, voice mail, etc.) available to the mobile devices 105 and 110. The details of such system configurations will not be discussed further here except to the extent to aid in understanding the exemplary embodiments described herein.

The NGG 150, for the system 100, allows for interoperability with a variety of different types of mobile devices and may be termed to be an open, standards-based platform for communicating data using protocols such as http. Likewise, the MMG 145 also provides for interoperability with a variety of different mobile devices. However, the MMG 145 provides functionality for providing access to multimedia content using media streaming protocols, such as the Real Time Streaming Protocol (RTSP), as described in RFC 2326.

If a clip is requested to be downloaded to mobile device 105, an http command, for example, is sent from the mobile device 105 via the NGG 150 to an application/content server 160, which may also be a server farm comprising a plurality of content servers. The clip is then downloaded (using the http protocol) to the mobile device 105, where it can be viewed (after is completely downloaded) using an appropriate media player client.

By the way of comparison, if a multimedia clip is requested to be streamed to the mobile device 105, an RTSP command, for example, is sent from the mobile device 105, via the MMG 145 to the application/content server 160. The RTSP command may be sent to the application/content server 160 via a multicast router 165 or, alternatively, may be sent directly to the application/content server 160.

The clip is then streamed to the mobile device via the MMG 145 using an appropriate protocol, such as RTSP, and an appropriate media encoding technique, such as MP3, WMA or the Synchronous Multimedia Integration Language (SMIL), among others. This streaming may be done via the multicast router 165 or, alternatively, the multimedia content may be sent directly from the application/content server 160 to the MMG 145 to be streamed to the mobile device 105. Techniques for streaming using unicast or multicast approaches are known and will not be discussed in detail here. Once the content is transferred to MMG 145 (e.g., via the multicast router 165 or directly) it is then communicated to the mobile device 105 via the HA 140, the PDSN 125, the BSC 125 and the BTS 115 using the streaming protocol (e.g., RTSP).

As was noted above, using current approaches, if the wireless connection between the mobile device (e.g., the mobile device 105) and the data network 137 (e.g., the MMG 145 of the network 137) is terminated during the streaming of a multimedia clip, a user of the mobile device 105 must return to the beginning of the clip and begin streaming the entire clip once the wireless connection has been reestablished. This approach is time and resource inefficient, as was previously discussed. It also results in a negative customer experience if the user experiences such a termination after playing a significant portion of a long clip (e.g., fifteen minutes of a thirty minute video clip).

Exemplary Methods for Streaming Multimedia Content

The methods illustrated in FIGS. 2-5 may be implemented in the system 100 shown in FIG. 1, though the invention is not so limited and other wireless communication system configurations may be employed. However, for the purposes of this disclosure, these methods will be described with reference to FIG. 1 and in the context of the foregoing description of that figure.

Referring now to FIG. 2, a flowchart illustrating an exemplary method 200 for streaming multimedia content in a wireless communication system (such as system 100) that overcomes the foregoing discussed disadvantages of current approaches is shown. The method 200, at block 210, comprises establishing a wireless connection between a mobile device (e.g. the mobile device 105) and a data network (e.g. the data network 137, which is the home network of the mobile device 105 for this embodiment). The connection with the data network 137 is authenticated/authorized by the AAA/SCS 155, as is known. At block 220, a request that multimedia content be streamed to the mobile device 105 is sent from the mobile device 105 to the application/content server 160. This request may be sent using a command of any appropriate streaming protocol, such as RTSP.

As may be seen in FIG. 1, for the system 100, such a request is communicated from the mobile device 105 to the application/content server 160 via the BTS 115, the BSC 120, the PDSN 125, the HA 140, the MMG 145 and then either directly to the application/content server 160, or to content server 160 the via the multicast router 165. It will be appreciated that a plurality of content servers and multicast routers may be employed in the system 100, and the configuration shown is exemplary.

The request is then received at the content server 160 at block 230. Responsive to receiving the request, the content server 160 streams the requested multimedia content to the mobile device at block 240. The requested multimedia content ("clip") may be streamed (e.g., using RTSP) in a unicast fashion, from the application content server 160 directly to the MMG 145 and then to the mobile device 105 via the HA 140, the PDSN 125, the BSC 120 and the BTS 115. Alternatively, the multimedia clip may be streamed to multiple devices simultaneously using the multicast router 165 to communicate the multimedia clip to the MMG 145 (and other devices), or may be streamed to a plurality of mobile devices on various data networks using a plurality of multicast routers. Such techniques are known, and will not be described in further detail.

At block 250, termination of the wireless connection is detected. Such detection may be accomplished in a number of fashions, and the invention is not limited to the use of any particular technique for detecting such termination. Exemplary embodiments for detecting termination of a wireless connection are discussed in further detail with respect to FIGS. 3A and 3B. Briefly, however, a termination may occur due to a loss of coverage, signal fade, a communication error, or any number of other causes, such as, for example, an inadvertent hang up (or disconnect) by a user of the mobile device.

At block 260, information is retained that indicates a point in the stream of the multimedia clip where termination of the wireless connection occurred. This information may be retained in the MMG 145, the content server 160, in the mobile device 105 itself, or in any other appropriate entity in the communication system 100. As was indicated above, current approaches for streaming multimedia content do not provide for retaining such information. An exemplary embodiment for retaining such information is discussed in further detail with respect to FIG. 4. Of course, numerous other techniques may also be employed to gather and retain such information. For example, a timer may be used in the mobile device 105. If a termination of the wireless connection is detected by the mobile device, the value of the timer may be stored, such as using appropriate logic executed on the mobile device, at the time when the termination is detected. This timer value would then correspond to the point in the multimedia stream where the termination occurred.

Alternatively, the MMG 145 could be notified of the termination, such as by a notification service application running on the PDSN 125. In response to a notification that the wireless connection has been terminated, the MMG 145 may execute appropriate logic to retain information related to the point in the multimedia content stream where the termination occurred. Depending on the particular embodiment, the retained information may be included in an extensible markup language (XML) attribute tag and comprise a timestamp corresponding to the point in the multimedia content stream where the termination occurred. Such an approach may be readily employed for embodiments where the multimedia content is encoded with the Synchronous Multimedia Integration Language (SMIL). Of course, other encoding methods may be employed that utilize XML attribute tags to retain such information. For example, depending the media type, the retained information may be included in special purpose RTSP headers (such as for MP3 or WMA formatted multimedia content).

In addition to a timestamp, or some other indication of the point in the multimedia stream where the termination occurred, the retained information includes an identifier of the mobile device 105 that experienced termination of its wireless connection during streaming. Such an identifier may be a point-to-point protocol (PPP) link identifier, a network address identifier (NAI) or an IP address. Such identifications are known, and are not described in detail here. Of course, other techniques besides PPP link identifiers, NAIs and IP addresses are possible, and the invention is not limited to these particular approaches.

At block 270, the method 200 further comprises reestablishing the wireless connection between the mobile device 105 and the data network 137. Once the wireless connection is reestablished, streaming of the multimedia content may be resumed based on the retained information. Depending on the particular embodiment, the retained information may be contained in the mobile device 105, the MMG 145, the application server 160, or another entity in the communication system 100.

Once the wireless connection is reestablished, the retained information (if not already contained on the MMG 145 and/or the content server 160) may be communicated to the MMG 145 and/or the content server 160. The MMG 145 and/or the content server may then execute appropriate logic to resume streaming the multimedia content based on the retained information. This resumption may occur automatically, or may occur as a result of a user selection to resume streaming the content. It will be appreciated that the wireless connection may be reestablished via a different MMG (e.g., second MMG) than the original wireless connection. In this situation, the retained information would be communicated to the MMG with which the wireless connection is reestablished and streaming would be resumed based on the retained information with second MMG.

In one embodiment, the multimedia content may be streamed from the point in the stream where the retained information indicates the termination occurred. Alternatively, the multimedia content may be streamed from a point that is a predetermined amount of time earlier in the stream than the point where the retained information indicates the termination occurred (e.g., 15 seconds earlier), so as to provide some overlap in the streamed content.

Exemplary Methods for Detecting Wireless Connection Termination

Referring now to FIG. 3A, a flowchart illustrating an exemplary method 300 for detecting the termination of a wireless connection is shown. At block 310, the BSC 120 (as shown in FIG. 1) determines that termination of the wireless connection has occurred by determining that a number of bad (communication) frames have been received from the mobile device 105. The number of bad frames may be determined in any number of ways, and such techniques are known. For the method 300, when the number of bad frames received consecutively by the BSC 120 exceeds a threshold value, the BSC 120 determines that termination of the wireless connection has occurred (e.g., due to signal fade, communication error, inadvertent hang up, etc.).

At block 320, the BSC 120 then communicates a message to the MMG 145 and/or the content server 160 that termination of the wireless connection has occurred. In response to this message, information about the multimedia content stream is retained, as was described above with reference to FIG. 2, by executing appropriate logic on the MMG 145 and/or the content server 160.

Referring now to FIG. 3B, a flowchart showing an alternative method 350 for determining that termination of a wireless connection has occurred is shown. At block 360, the BSC 120 determines that the wireless connection cannot be handed off from one BTS (e.g. 115) to another BTS (not shown). Such handoffs occur when the mobile device 105 is moved from the coverage area of one BTS into the coverage area of another BTS. Such terminations may occur, for example, if the second BTS is overloaded with other wireless connections (e.g., is at its connection capacity or bandwidth capability) or if there is insufficient overlap in the coverage of the two BTSs. As a result of either of these situations, the BSC 120 will terminate the wireless connection. Of course, detecting that termination the wireless connection has occurred may be done in a number of other ways.

At block 370, the BSC 120 then communicates a message to the MMG 145 and/or the content server 160 that termination of the wireless connection has occurred. As was described above with reference to FIG. 3A, in response to this message, information about the multimedia content stream is retained, as was described above with reference to FIG. 2, by executing appropriate logic on the MMG 145 and/or the content server 160.

Exemplary Method for Retaining Streaming Information

Referring now to FIG. 4, a flowchart illustrating an exemplary method 400 for retaining information related to a multimedia content stream that is interrupted by the termination of a wireless connection is shown. At block 410, the information to be retained is collected by the content server 160. As was previously discussed, the content server 160 may collect such information in response to receiving a message from, for example, the BSC 120, that the wireless connection has been terminated. As was also described above, the information to be retained includes an indication of the point in the multimedia stream where the termination occurred (e.g. such as a timestamp, a frame reference, an elapsed time, etc.) and an identifier of the mobile device which experienced the termination.

At block 420, the information to be retained is communicated to the MMG 145 and is stored in a database that is either included in the MMG 145 or in a database that is operatively associated with the MMG 145. Such an approach is advantageous as the MMG 145 exists in the data network 137 (e.g., the home network of the mobile device 105). In this regard, when the wireless connection is reestablished between the mobile device 105 and the data network 137, the MMG 145 may be readily notified of this occurrence and, in turn, provide a notification to the content server 160 that the wireless connection has been reestablished so that resumption of the multimedia content stream may be effected, such as by using the approaches discussed herein.

Exemplary Method for Resuming Streaming

Referring now to FIG. 5, a flowchart illustrating an exemplary method 500 for resuming streaming of a multimedia content stream is shown. At block 510 of the method 500, a user option is provided (e.g., such as using a dialog box on the mobile device 105) to either resume streaming of an interrupted multimedia stream or to cancel the stream. This option is provided in response to the wireless connection be reestablished. At block 520, in response to the user indicating that streaming should be continued, the retained information is communicated from the MMG 145 (e.g., from the database as described with reference to FIG. 4) to the content server 160.

At block 530, the content server 160 then communicates appropriate logic to the MMG 145 (or a second MMG) for resuming the multimedia content stream in accordance with the retained information. The logic is then executed by the MMG 145 (e.g., in conjunction with the content server 160), at block 540, to resume streaming of the multimedia content, such as in the manners described above.

CONCLUSION

Exemplary arrangements of the present invention have been described herein. It will be appreciated, however, that those skilled in the art will understand that changes and modifications may be made to these arrangements without departing from the true scope and spirit of the present invention, which is defined by the following claims.

What is claimed is:

1. A method comprising:
a content server device receiving a request from a mobile device, wherein the request seeks to have the content server device stream multimedia content to the mobile device, wherein the mobile device communicates via a wireless connection of which the mobile device is an endpoint;
in response to receiving the request, the content server device streaming a first portion of the requested multimedia content to the mobile device via a first multimedia gateway (MMG) device and the wireless connection, wherein the mobile device communicates with the first MMG device via the wireless connection;
while the content server device is streaming the first portion of the requested multimedia content to the mobile device, the content server device receiving, from the first MMG device, a termination indication specifying that the wireless connection has terminated;
in response to receiving the termination indication, the content server device storing information indicating a point in the requested multimedia content at which the termination of the wireless connection occurred;
the content server device receiving, from a second MMG device, a re-establishment indication specifying that the wireless connection has been re-established, wherein the mobile device communicates with the second MMG device via the wireless connection; and
in response to receiving the re-establishment indication, the content server device (i) retrieving the stored information, and (ii) based on the retrieved information, streaming a second portion of the requested multimedia content to the mobile device via the second MMG device and the wireless connection.

2. The method of claim 1, wherein storing information indicating the point in the requested multimedia content at which the termination of the wireless connection occurred comprises:
transmitting, to the first MMG device, the information indicating the point in the requested multimedia content at which the termination of the wireless connection occurred.

3. The method of claim 2, wherein retrieving the stored information comprises:
receiving, from the first MMG device, the stored information.

4. The method of claim 1, wherein the stored information includes an identifier of the mobile device.

5. The method of claim 1, wherein streaming the second portion of the requested multimedia content to the mobile device comprises:
streaming the second portion beginning at the point in the requested multimedia content at which the termination of the wireless connection occurred.

6. The method of claim 1, wherein streaming the second portion of the requested multimedia content to the mobile device comprises:
streaming the second portion beginning a predetermined amount of time earlier in the requested multimedia content than the point at which the termination of the wireless connection occurred.

7. The method of claim 1, wherein the mobile device is served by a base station controller (BSC) that is capable of determining that the wireless connection has terminated, wherein the mobile device and the content server device also communicate via the BSC, and wherein the first MMG device transmitting the termination indication is triggered by the first MMG device receiving, from the BSC, a termination notification indicating that the BSC has determined that the wireless connection has terminated.

8. The method of claim 7, wherein the BSC is also capable of determining that the wireless connection has been re-established, and wherein the second MMG device transmitting the re-establishment indication is triggered by the second MMG device receiving a re-establishment notification from the BSC indicating that the wireless connection has been re-established.

9. A method comprising:
a multimedia gateway (MMG) device receiving a request from a mobile device, wherein the request seeks to have a content server device stream multimedia content to the mobile device, wherein the mobile device communicates with the MMG device via a wireless connection of which the mobile device is an endpoint;
in response to receiving the request, the MMG device transmitting the request to the content server device;
the MMG device receiving, from the content server device, at least part of the requested multimedia content;
in response to receiving the multimedia content, the MMG device streaming a first portion of the requested multimedia content to the mobile device via the wireless connection;
while the MMG device is streaming the first portion of the requested multimedia content to the mobile device, the MMG device receiving a termination indication specifying that the wireless connection has terminated;
in response to receiving the termination indication, the MMG device storing information indicating a point in the requested multimedia content at which the termination of the wireless connection occurred;
the MMG device receiving a re-establishment indication specifying that the wireless connection has been re-established; and
in response to receiving the re-establishment indication, the MMG device (i) retrieving the stored information, and (ii) based on the point in the requested multimedia content at which the termination of the wireless connection occurred, streaming a second portion of the requested multimedia content to the mobile device.

10. The method of claim 9, further comprising:
in response to receiving the re-establishment indication, the MMG device also transmitting the re-establishment indication to the content server device; and
the MMG device receiving, from the content server device, logic for streaming the second portion of the requested multimedia content to the mobile device.

11. The method of claim 9, wherein the mobile device and the MMG device also communicate via a base station controller (BSC) that is capable of determining that the wireless connection has terminated, and wherein the MMG device receives the termination indication from the BSC as a result of the BSC determining that the wireless connection has terminated.

12. The method of claim 9, wherein streaming the second portion of the requested multimedia content to the mobile device comprises:
streaming the second portion beginning a predetermined amount of time earlier in the requested multimedia content than the point at which the termination of the wireless connection occurred.

13. A content server device having a set of instructions that, when executed, cause to the content server device to perform operations comprising:
receiving a request from a mobile device, wherein the request seeks to have the content server device stream multimedia content to the mobile device;
in response to receiving the request, streaming a first portion of the requested multimedia content to the mobile device via a first MMG device and the wireless connection, wherein the mobile device communicates with the first MMG device via the wireless connection;
while streaming the first portion of the requested multimedia content to the mobile device, receiving, from the first MMG device, a termination indication specifying that the wireless connection has terminated;
in response to receiving the termination indication, storing information indicating a point in the requested multimedia content at which the termination of the wireless connection occurred;
receiving, from a second MMG device, a re-establishment indication specifying that the wireless connection has been re-established, wherein the mobile device communicates with the second MMG device via the wireless connection; and
in response to receiving the re-establishment indication, (i) retrieving the stored information, and (ii) based on the retrieved information, streaming a second portion of the requested multimedia content to the mobile device via the second MMG device and the wireless connection.

14. The content server device of claim 13, wherein storing information indicating the point in the requested multimedia content at which the termination of the wireless connection occurred comprises:
transmitting, to the first MMG device, the information indicating the point in the requested multimedia content at which the termination of the wireless connection occurred.

15. The content server device of claim 14, wherein retrieving the stored information comprises:
receiving, from the first MMG device, the stored information.

16. The content server device of claim 13, wherein the stored information includes an identifier of the mobile device.

17. The content server device of claim 13, wherein streaming the second portion of the requested multimedia content to the mobile device comprises:

streaming the second portion beginning at the point in the requested multimedia content at which the termination of the wireless connection occurred.

18. The content server device of claim 13, wherein streaming the second portion of the requested multimedia content to the mobile device comprises:

streaming the second portion beginning a predetermined amount of time earlier in the requested multimedia content than the point at which the termination of the wireless connection occurred.

19. The content server device of claim 13, wherein the mobile device is served by a base station controller (BSC) that is capable of determining that the wireless connection has terminated, wherein the mobile device and the content server device also communicates via the BSC, and wherein the first MMG device transmitting the termination indication is triggered by the first MMG device receiving, from the BSC, a termination notification indicating that the BSC has determined that wireless connection has terminated.

20. The content server device of claim 19, wherein the BSC is also capable of determining that the wireless connection has been re-established, and wherein the second MMG device transmitting the re-establishment indication is triggered by the second MMG device receiving a re-establishment notification from the BSC indicating that the wireless connection has been re-established.

* * * * *